United States Patent
Salour

(10) Patent No.: US 10,951,462 B1
(45) Date of Patent: Mar. 16, 2021

(54) FAULT ISOLATION IN DATA COMMUNICATIONS CENTERS

(71) Applicant: 8x8, Inc., San Jose, CA (US)

(72) Inventor: Mehdi Salour, San Jose, CA (US)

(73) Assignee: 8x8, Inc., Campbell, CA (US)

( * ) Notice: Subject to any disclaimer, the term of this patent is extended or adjusted under 35 U.S.C. 154(b) by 92 days.

(21) Appl. No.: 15/964,950

(22) Filed: Apr. 27, 2018

Related U.S. Application Data

(60) Provisional application No. 62/490,998, filed on Apr. 27, 2017.

(51) Int. Cl.
*H04L 12/24* (2006.01)
*H04L 12/26* (2006.01)

(52) U.S. Cl.
CPC .......... *H04L 41/0659* (2013.01); *H04L 43/04* (2013.01)

(58) Field of Classification Search
None
See application file for complete search history.

(56) References Cited

U.S. PATENT DOCUMENTS

| | | | |
|---|---|---|---|
| 6,041,037 A | 3/2000 | Nishio et al. | |
| 6,154,448 A | 11/2000 | Petersen et al. | |
| 6,763,380 B1 | 7/2004 | Mayton et al. | |
| 7,043,661 B2 | 5/2006 | Valadarsky et al. | |
| 9,203,740 B2 | 12/2015 | Liu et al. | |
| 2010/0124165 A1* | 5/2010 | Yang | H04L 41/0663 370/217 |
| 2012/0093005 A1 | 4/2012 | Li et al. | |
| 2013/0311832 A1 | 11/2013 | Lad et al. | |
| 2014/0379894 A1* | 12/2014 | Allen | H04L 41/0645 709/224 |
| 2015/0113118 A1* | 4/2015 | Jain | H04L 41/145 709/224 |

(Continued)

OTHER PUBLICATIONS

U.S. Appl. No. 15/240,391, filed Aug. 18, 2016. The Examiner is respectfully referred to this copending patent prosecution of the common Assignee (no attachment).

(Continued)

*Primary Examiner* — Adnan Baig
(74) *Attorney, Agent, or Firm* — Crawford Maunu PLLC

(57) ABSTRACT

Certain aspects of the disclosure are directed to fault isolation in data communications centers. According to a specific example, a data communications server is provided including circuitry configured and arranged to isolate quality or termination issues in a data communications center. The data communications server may retrieve server data relating to data communications routed by the data communications server, and receive from a plurality of endpoint devices communicatively coupled to the data communications server, endpoint data relating to the routed communications. The data communications server may identify data communications quality or data communications termination issues based on the server data and the endpoint data, and identify at least one zone among a plurality of zones of the data communications center associated with the data communications quality or data communications termination issues using a tiered fault isolation process and based on the server data and endpoint data.

6 Claims, 4 Drawing Sheets

(56) References Cited

U.S. PATENT DOCUMENTS

2015/0149609 A1* 5/2015 Zou .................... H04L 43/08
709/224
2018/0107706 A1* 4/2018 Mishra ................ G06F 16/2379

OTHER PUBLICATIONS

U.S. Appl. No. 15/240,457, filed Aug. 18, 2016. The Examiner is respectfully referred to this copending patent prosecution of the common Assignee (no attachment).

* cited by examiner

FAULT ISOLATION IN DATA COMMUNICATIONS CENTERS

OVERVIEW

Aspects of various embodiments are directed to fault isolation in data communications centers. Data communications centers have allowed individuals to transmit data communications using broadband Internet connections in place of traditional telephone lines. A communications endpoint device can use a broadband Internet connection to connect to a data communications server that is managed by a data communications service provider. The data communications server can handle data communications routing and provide other data communications services for the communications endpoint device.

Computing servers are increasingly being used to provide various data communications services over a network including, but not limited to, routing of Voice over Internet Protocol (VoIP) calls and/or data service providers for providing communications services such as messaging, video conferencing, management of data communications exchange servers, packet switching, traffic management, website hosting, remote data storage, remote computing services, and management of virtual computing environments, among other examples. For ease of reference, the various applications, systems and services that may be provided by such computing servers may be collectively referred to as data communications services.

SUMMARY

Various example embodiments are directed to issues such as those addressed above and/or others which may become apparent from the following disclosure concerning systems and methods for fault isolation in a data communications center.

In an example embodiment, an apparatus includes a data communications server configured to provide data communications for a plurality of endpoint devices associated with respective ones of a plurality of disparate client entities. The data communications server may provide the data communications, for example, by setting up service relationships with a plurality of disparate client entities, and providing data communications based on the service relationships. The apparatus also includes circuitry configured and arranged to map a data communications center to a series of zones and isolate data communications quality or termination issues to one of the series of zones. For instance, the circuitry can be configured and arranged to process a series of sequential analyses to isolate a particular zone of the data communications center from which the issue is arising.

In another example embodiment, a fault isolation server is provided for fault isolation in a data communications center. The fault isolation server may include circuitry configured and arranged to receive from a plurality of endpoint devices communicatively coupled to a data communications server, endpoint data relating to data communications routed within the data communications center. The fault isolation server may also include circuitry configured and arranged to receive from at least one data communications server, server data relating to the routed data communications and isolate an identified data communications quality issue to a particular zone or plurality of zones in the data communications center. The fault isolation server may isolate the identified issue based on the endpoint data and the server data, and using a data communications quality analysis. The fault isolation server may isolate the quality or termination issue by identifying at least one zone among a plurality of zones of the data communications center associated with the data communications quality or data communications termination issues using a tiered fault isolation process and including the server data and endpoint data, by analyzing communications issues at different tiered levels of common failure aspects. The fault isolation server may further include circuitry configured and arranged to provide on a user interface, a recommended resolution to address the data communications quality issue in response to the isolation of the data communications quality issue. In further example embodiments, the fault isolation server may include circuitry configured and arranged to isolate an identified data communications termination issue in the data communications center based on the endpoint data and the server data, and to provide a recommended resolution to the termination issue in response to the isolation.

The above discussion/summary is not intended to describe each embodiment or every implementation of the present disclosure. The figures and detailed description that follow also exemplify various embodiments.

BRIEF DESCRIPTION OF FIGURES

Various example embodiments may be more completely understood in consideration of the following detailed description in connection with the accompanying drawings, in which.

Figure 1:
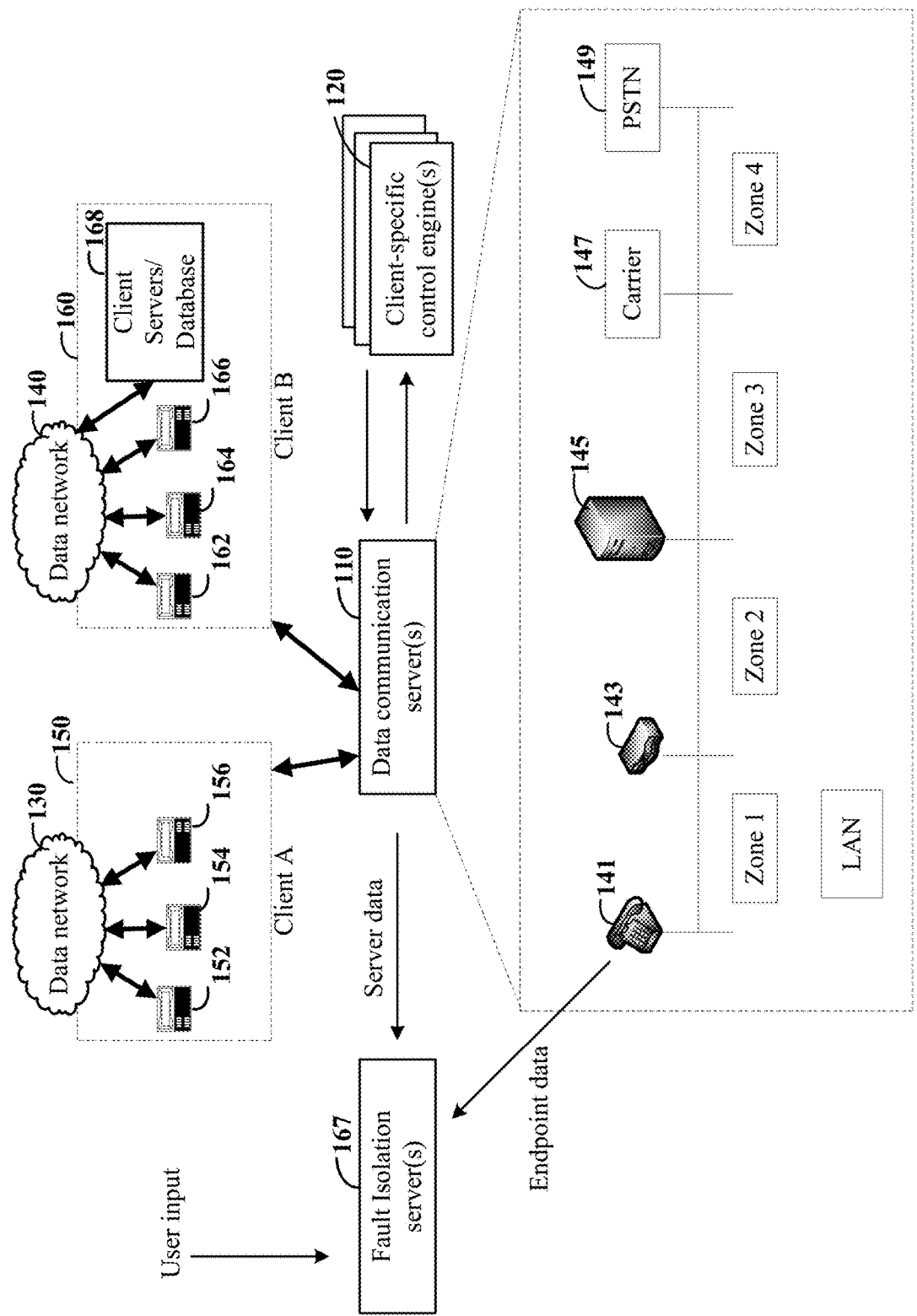
FIG. 1 shows a block diagram of an example system for providing data communications for endpoints of a plurality of client accounts, consistent with embodiments of the present disclosure.

While various embodiments discussed herein are amenable to modifications and alternative forms, aspects thereof have been shown by way of example in the drawings and will be described in detail. It should be understood, however, that the intention is not to limit the disclosure to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

DETAILED DESCRIPTION

Aspects of the present disclosure are believed to be applicable to a variety of different types of apparatuses, systems and methods involving providing remote services for endpoint devices associated with a plurality of different client accounts. In certain implementations, aspects of the present disclosure have been shown to be beneficial when used in the context of providing data communications services. While the disclosure is not necessarily limited to data communications centers in the form of a Software as a Service (SaaS), Platform as a Service (PaaS), as used in the following discussion to exemplify certain specific advantageous embodiments.

Certain embodiments of the present disclosure are directed toward an interface that allows for isolation of data communications issues to a particular area of the data communications center. The particular area or areas within the data communications center may be referred to as "zones" of the data communications center within which the issue or problem is expected to be. Such fault isolation may include eliminating these zones until a single zone remains. To eliminate the zones which are not experiencing a fault, a hierarchal analysis (e.g., a series of probing questions) may be performed that is designed to efficiently and accurately determine a probable root cause of the data communications issues, and to outline what actions need to be taken to resolve the issue.

As an illustrative example, a data communications center may be partitioned into various zones, each zone including different, but connected, aspects of the data communications center. A first zone may include various endpoint devices including internet protocol private branch exchanges (IP-BXs) acting as a telephone system that switches data communications between enterprise users on local lines while allowing all users to share a certain number of external phone lines (that are supported by telephone carriers and individually addressable within the PSTN).

As another example, the first zone may include various endpoint devices including IPBXs that can provide Direct Inward Dialing (DID) as a service where a telephone carrier provides a block of telephone numbers that are each routed to an IPBX system rather than to individual telephone lines. Using DID, individual phone numbers can be provided to each person or workstation without separate physical lines tied into the IPBX for each possible connection. The first zone may include the connections between these various endpoints, to a respective router, modem or gateway. The first zone may include the entirety of a local area network (LAN). In another example, a second zone may include connections between the LAN and the data communications servers. This zone may include the physical connection and signaling that passes through an internet service provider (ISP). Additional and/or different zones are described more fully herein. In each of the above examples, aspects of the instant disclosure are directed to isolating data communications center issues relative to such zones.

In the following description, various specific details are set forth to describe more specific examples. It should be apparent to one skilled in the art, however, that one or more other examples and/or variations of these examples may be practiced without all the specific details given below. In other instances, well known features have not been described in detail so as not to obscure the description of the examples herein. For ease of illustration, the different diagrams can refer to the same elements, more specific embodiments, or additional instances of the same element. Also, although aspects and features may in some cases be described in individual figures, it will be appreciated that features from one figure or embodiment can be combined with features of another figure or embodiment even when the combination is not explicitly shown or explicitly described as a combination. For ease of explanation, some examples may be primarily described with reference to data communications servers configured to provide data communications services for endpoints of a plurality of different client accounts. It is understood that the various examples may be adapted for use with computing servers configured to provide various communications services, including but not limited to, routing of data messages/packets, VoIP calls, video conferencing, management of data communications exchange servers, packet switching, traffic management, management of virtual computing environments, routing of text and chat messages, website hosting, remote data storage, and remote computing services, among other services.

In one specific example embodiment, a data communications center includes one or more data communications servers configured to provide data communications for sets of endpoint devices of respective client accounts. Each of the endpoint devices includes data communications-enabled circuitry, and may include for example, IP phones, smart phones, tablets, desktop computers, plain old telephone service (POTS) telephones, and cellular-capable devices among other example devices with circuitry configured and arranged to facilitate sending and receipt of data communications. Each endpoint device is respectively associated with an account of a respective client. Endpoint devices may be associated with a particular client account by registering the endpoint device with a particular client account serviced by the data communications server(s). Registered devices for each client account may be specified in a respective account settings file accessible by the data communications server(s).

In different embodiments, it will also be appreciated that features discussed herein operate with the contemplated data communications server(s) providing data communications using various processes and circuits. As one example, the data communications server(s) may provide data communications by routing and establishing data communications for the endpoint of each of the plurality of disparate client entities, and generating data communications event data for the routed data communications. A particular example of a data communications server may use session initiation protocol (SIP) to handle various data communications functions (e.g., data communications setup and tear down). However, the various embodiments discussed herein are not necessarily limited thereto. Consistent with the above and in other embodiments disclosed herein, the data communications servers can be configured to establish a leg of the data communications from one endpoint device (or dial peer) to another endpoint device or to a gateway.

Consistent with the above-characterized embodiments, a computing server may be configured to isolate a fault in a data communications center. The computing server may include circuitry configured to receive input data from endpoint devices and data communications servers in the data communications center. The computing server may process a series of sequential analyses based on the received input data to isolate data communications quality and/or termination issues associated with a particular zone of the data communications center. If quality issues affect the data communications center, the computing server may perform a communications quality analysis, whereas if termination issues affect the data communications center, the computing server may perform a termination analysis. The quality analysis and the termination analysis may include a series of sequential analyses performed by the computing server to isolate the source of the quality issue or the termination issue. The computing server that performs the quality analysis and/or the termination analysis may include the data communications center server (such as a server also engaged in routing data communications to and/or from communications endpoints) and/or a designated fault isolation server configured and arranged specifically for isolating faults within the data communications center.

As a specific example, a data communications server may include circuitry configured and arranged to retrieve data relating to data communications routed by the data communications server. The data communications server may also receive from a plurality of endpoint devices communicatively coupled to the data communications server, endpoint data relating to the routed data communications. Using the server data and endpoint data, the data communications server may identify data communications quality or termination issues, and identify at least one zone among a plurality of zones of the data communications center associated with the identified quality or termination issues. In isolating the quality or termination issues to one or a plurality of zones of the data communications center, the data communications server may use a tiered fault isolation algorithm. For example, the data communications server can be configured to initiate such a data communications quality analysis in response to criteria such as identification of a dropped data communication, poor audio performance, and/or one-way audio (or a combination thereof). In another example, the tiered fault isolation process may be a data communications termination analysis, in which the data communications server is configured and arranged to initiate the termination analysis in response to identification of at least one of an inability to receive inbound data communications, an inability to dial outbound, and an inability to dial a specific area code or region.

The data communications server carrying out the fault isolation analysis may isolate a source of the quality or termination issues in a number of ways. In some instances, the data communications server may correlate an incidence of the identified quality or termination issues to a hardware or software change in the data communications center. For instance, the data communications server may correlate recent firmware updates, new network devices, changes to the operating system, or changes with the internet service provider with the identified quality or termination issues. Such correlation may be in addition to the quality analysis and/or the termination analysis. Additional network analyses may be performed by the data communications server and/or the fault isolation server. For example, the data communications server may be configured and arranged to initiate a speed test of the data communications center, a network utility application, verify router settings, and/or verifying that endpoints are using a correct virtual local area network (VLAN). Such network analyses may be initiated by the data communications server (and/or the dedicated fault isolation server, as the case may be) in response to a determination that quality issues are present for a threshold period of time (e.g., that the data communications quality issues are constant).

In another specific example, a fault isolation server of a data communications center is provided. The fault isolation server may include circuitry configured and arranged to receive from a plurality of endpoint devices communicatively coupled to a data communications server, endpoint data relating to data communications routed within the data communications center. The fault isolation server may also receive from at least one data communications server, server data relating to the routed data communications. The fault isolation server may identify at least one zone among a plurality of zones of the data communications center associated with the data communications quality or data communications termination issues using a tiered fault isolation process and including the server data and endpoint data, by analyzing communications issues at different tiered levels of common failure aspects. Using a quality analysis, the fault isolation server may isolate an identified data communications quality issue to a particular zone or plurality of zones in the data communications center based on the endpoint data and the server data. For instance, in response to a determination at a first analysis level of the quality analysis, that the quality issue affects both inbound and outbound data communications, the fault isolation server may initiate a second analysis level of the quality analysis to further identify the source of the data communications quality issue. At the second analysis level, the fault isolation server may identify a number of end-point device extensions (e.g., associated with a client-entity server in a PaaS system environment) that are affected by the data communications quality issue, and determine at a third analysis level a number of endpoint locations or LANs that are affected by the data communications quality issue. In response to a determination that one or some extensions in the data communications center system are experiencing the data communications quality issue, the fault isolation server may isolate the data communications quality issue to a first zone of the plurality of zones, where the first zone includes a LAN or another circuit/node under the control of a remote server (such as a client-specific server). In response to isolating the data communications quality issue to the first zone, the fault isolation server may initiate an upstream fault isolation process starting from a particular endpoint to identify a source of the data communications quality issue.

PaaS and SaaS are exemplified in the context of data communications centers. For example, PaaS refers to or includes a category of cloud computing services that provide a platform allowing customers to develop, run, and manage applications without the complexity of building and maintaining the infrastructure typically associated with developing and launching an application. PaaS can be delivered with a SaaS functionality as a public cloud service from a provider, where the consumer controls software deployment with minimal configuration options, and the provider provides the networks, servers, storage, OS, 'middleware' (e.g. Java runtime, .NET runtime, integration, etc.), database and other services to host the consumer's application. Similarly, PaaS can be delivered as a private service (software or appliance) inside the firewall, or as software deployed on a public infrastructure as a service. For further information regarding PaaS, reference may be made to U.S. patent application Ser. No. 15/240,391, as well as U.S. patent application Ser. No. 15/240,457, which are fully incorporated by reference.

In response to a determination by the fault isolation server that all extensions in the data communications center with a same local area network (LAN) are experiencing the data communications quality issue, the fault isolation server may isolate the data communications quality issue to a first zone of the plurality of zones or a second zone of the plurality of zones. As described herein, the second zone includes a connection between the LAN and the data communications server. In response to isolating the issue to the first or second zone, the fault isolation server may initiate an upstream fault isolation process starting from the network switch to isolate the data communications quality issue. If, on the other hand, the fault isolation server determines that a plurality of extensions on different LANs in the data communications center are affected by the data communications quality issue, the fault isolation server may isolate the data communications quality issues to a third zone or a fourth zone. The third zone includes a connection between the data communications server and a carrier of the data communications center, and the fourth zone includes a connection between the carrier and a public switched telephone network (PSTN). In response to such a determination, the fault isolation server may initiate a fourth analysis level of the data communications quality analysis in response to the determination that the data communications quality issue is isolated to zones three or four.

The fault isolation server may perform subsequent analysis to isolate a fault in the data communications center based on a previous determination. For instance, in response to a determination at a first analysis level of the data communications quality analysis that the data communications quality issue affects inbound data communications or outbound data communications (but not both), the fault isolation server may initiate a fourth analysis level of the data communications quality analysis. In the fourth analysis level, the fault isolation server may determine if the data communications quality issues are reproducible both on network, off network, or on and off network. On-network refers to or includes data communications between data communications endpoints. Off-network refers to or includes data communications directly to or from data communications service provider endpoints and PSTN or endpoints outside of the data communications center, such as cell phones. In response to a determination at the fourth analysis level that the data communications quality issues are reproducible both on and off network, the fault isolation server may isolate the data communications quality issue to the first zone or the second zone. Additionally and/or alternatively, in response to a determination at the fourth analysis level that the data communications quality issues are reproducible only off network, the fault isolation server may isolate the data communications quality issue to the third zone or the fourth zone.

In another specific example, the fault isolation server may isolate an identified termination issue to a particular zone or plurality of zones in the data communications center based on the endpoint data and the server data, and using a data communications termination analysis. For instance, the fault isolation server may initiate a second analysis level of the termination analysis in response to a determination that the termination issue is intermittent. Moreover, the fault isolation server may initiate a fourth analysis level of the termination analysis in response to a determination that both inbound and outbound data communications do not establish a connection, or that only inbound data communications do not establish a connection. At the fourth analysis level, the fault isolation server may determine wither the termination issue may be reproduced on-network and off-network, where on-network refers to or includes data communications between network endpoints (e.g., endpoints within the data communications center), and off-network refers to or includes data communications between network endpoints and PSTN or non-network endpoints (e.g., endpoints that are outside of the data communications center), such as cell phones. In response to a determination by the fault isolation server (at the fourth analysis level) that the termination issue is experiencing both on and off network, the fault isolation server may force inbound data communications to voicemail and perform the fourth analysis level again. If data communications still do not establish, the fault isolation server may isolate the termination issue to the third zone. In contrast, in response to a determination (at the fourth analysis level) that only off-network data communications are affected by the termination issue, the fault isolation server may isolate the issue to the third zone and prompt an end-user of the fault isolation server to contact a provider of the data communications center to resolve the issue.

Additionally and/or alternatively, if at the fourth level analysis, the fault isolation server determines that data communications establish once inbound data communications are forced to voicemail, then the fault isolation server may isolate the termination issue to the first zone or the second zone and initiate a third analysis level of the termination analysis. In yet further examples, if at the fourth analysis level, the fault isolation server determines that both on and off network data communications experience intermittent termination issues, then the fault isolation server may isolate the termination issue to the first zone or the second zone and initiate a fifth analysis level of the termination analysis in response. At the fifth analysis level, the fault isolation server may determine if all or some areas are experiencing data communications termination issues. In response to a determination (at the fifth analysis level) that all areas are experiencing issues, the fault isolation server may isolate the data communications termination issue to the first zone, the second zone, or the third zone of the data communications center, and initiate a fourth analysis level of the termination analysis. In response to a determination (at the fifth analysis level) that only some or specific areas of the data communications center are affected by the termination issue, the fault isolation server may isolate the termination issue to the third zone or the fourth zone, and initiate a fourth analysis level (e.g., repeat the fourth analysis level) of the termination analysis. Yet further, in response to a determination (at the fifth analysis level) that only international data communications are affected by the termination issue, the fault isolation server may isolate the data communications termination issue to the third zone and prompt an end-user of the fault isolation server to verify international data communications options established for the data communications center.

Turning now to the figures, FIG. 1 shows a block diagram of a system for isolating faults in a data communications center, consistent with embodiments of the present disclosure. As illustrated in the upper part of FIG. 1, various servers may be included in the data communications center. These servers may implement fault isolation as illustrated in the lower part of FIG. 1.

As illustrated in FIG. 1, the example data communications center includes a data communication server 110 configured to provide data communications for a plurality of endpoint devices 152, 154, 156, 162, 164, and 166 connected in one or more data networks 130 and 140. The endpoint devices may include data communications-enabled devices including IP phones, smart phones, tablets, and/or desktop computers, plain old telephone service (POTS) telephones, and cellular-capable devices, among others. Each endpoint device is respectively associated with an account of a respective client. Endpoint devices may be associated with a particular client account by registering the endpoint device with a particular client account serviced by the data communications server. Registered devices for each client account may be listed in a respective account settings file (not shown) stored by the data communications servers 110. In this example, endpoint devices 152, 154, and 156 are associated with in an account 150 for a first client A and endpoint devices 162, 164, and 166 are associated with in an account 160 for a second client B.

The system includes one or more processing circuits configured to implement client-specific control engines 120, which are configured to adjust the data communications provided for each client account according to a respective set of control directives. For instance, the client-specific control engines 120 may adjust routing of a data communication for a client account by generating client-specific sets of control data to the data communications server 110. The client-specific control engines 120 communicate the client-specific control data to the data communications server(s) using an interface protocol having an instruction format that is independent of an instruction format used to implement the client specific control engines 120 and/or client-specific control directives.

Different embodiments may implement the client-specific control engines 120 in various locations. For example, client-specific control engines 120 for one or more client accounts may be implemented in a central server connected to, or incorporated with, the data communications server(s) 110. Additionally or alternatively, one or more client-specific control engine 120 may be implemented by one or more processing circuits maintained by the client (e.g., server/database 168). Similarly, the control directives may be stored locally within the client-specific control engines, or stored remotely (e.g., in a centralized database, in a database maintained by the client or a combination thereof).

As previously described, client-specific control engines may be used to facilitate adjustment of a variety of remote services including, for example, communications services such as VoIP calls, audio and/or video conferencing, IPBX exchange servers, packet switching, chat, messaging, and traffic management as well as website hosting, remote data storage, management of remote computing services, and management of virtual computing environments, among other examples. One or more of such services may be provided, for example, by a cloud computing network having one or more servers configurable for a plurality of clients.

As illustrated in the lower portion of FIG. 1, the data communications server 110 and/or the fault isolation server 167 may partition the data communications center into a plurality of zones. A first zone (e.g., Zone 1 illustrated in FIG. 1) may cover the connection from the data communications endpoint 141 to a router 143, modem or gateway. This area includes the entirety of a Local Area Network or LAN. A second zone (e.g., Zone 2 illustrated in FIG. 1), can be selected to cover the connection between the LAN and the data communications server(s) 145. This zone includes the physical connection and signaling that passes through the Internet Service Provider or ISP. A third zone (e.g., Zone 3 illustrated in FIG. 3) can cover the connection between the data communications servers 145 and the data communications carriers 147. A forth zone (e.g., Zone 4 illustrated in FIG. 4) encompasses the connection between the data communications carriers 147 and the Public Switched Telephone Network (PSTN) 149. This area includes the receiving party's local telephone service provider. As discussed further herein, the data communications server 110 and/or the fault isolation server 167 may isolate a fault within the data communications center among one, or a few, of the various zones illustrated in order to more efficiently isolate data communications termination issues, data communications quality issues, and/or other issues relating to data communications services. In doing so, the fault isolation server 167 may obtain server data from the data communications server(s) 110, as well as endpoint data from various endpoints (e.g., 141, 143, 145, 147, and/or 149). In some examples, the fault isolation server 167 may also obtain user input, such as responses to inquiries throughout the fault isolation analysis.

Figure 2:
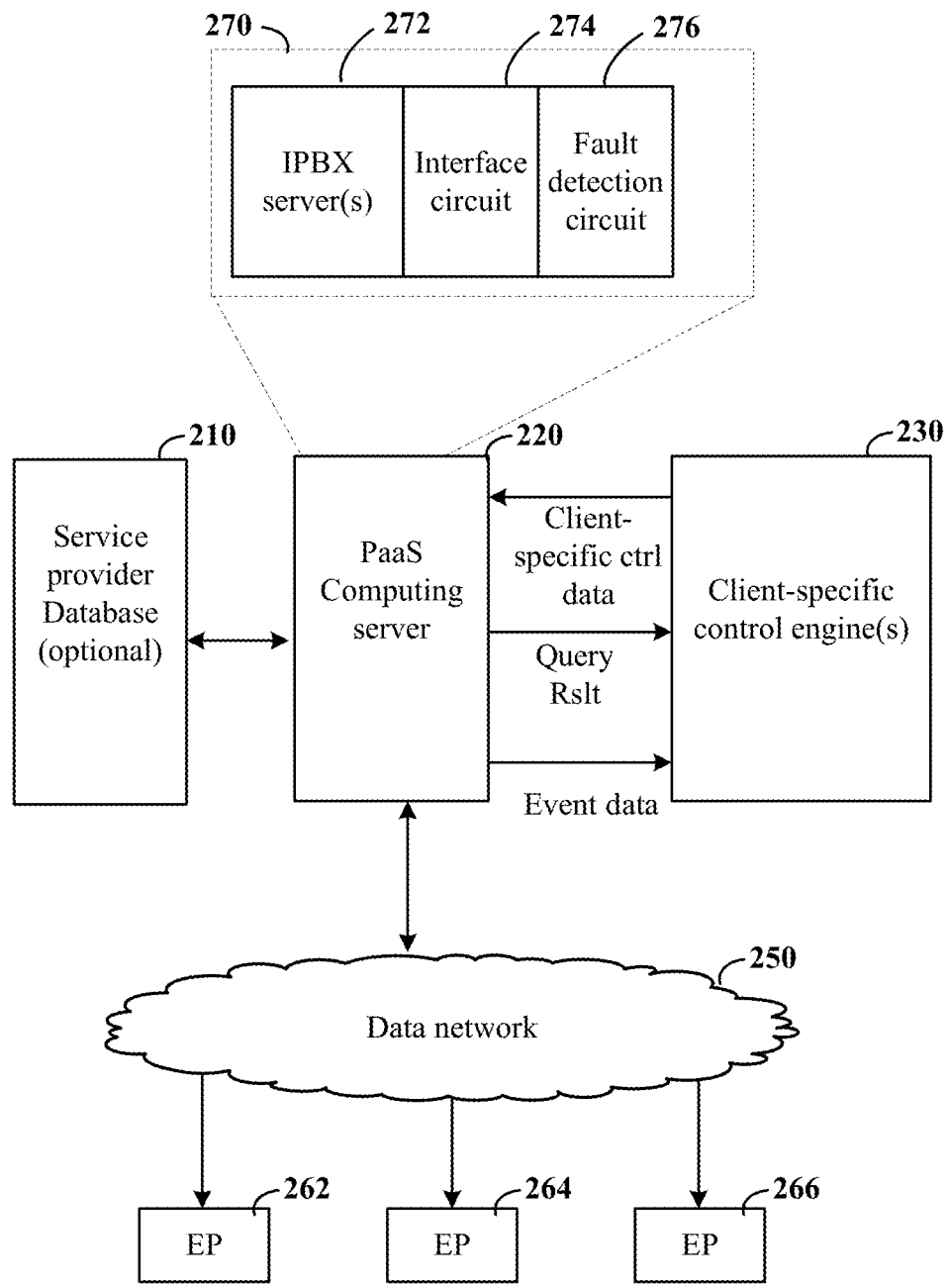
FIG. 2 shows a block diagram of an example system for providing Platform as a Service (PaaS) remote services for endpoints of a plurality of client accounts, consistent with embodiments of the present disclosure.

FIG. 2 shows a block diagram of an example system for providing communications services for endpoints of a plurality of client accounts, consistent with embodiments of the present disclosure. The system includes a PaaS computing server 220 configurable to provide one or more communications services for a plurality of endpoint devices 262, 264, and 266 connected in a data network 250. The endpoint devices may include communications-enabled devices, as described herein, and each endpoint device may be respectively associated with an account of a respective client.

The PaaS computing server 220 and client-specific control engines 230 may be implemented using various circuit arrangements. Block 270 shows an example implementation of a PaaS computing server configured to provide an IPBX service for a client. The example computing server 270 includes one or more IPBX server(s) 272 configured to establish and direct data communications for a plurality of endpoints of a customer account. Interface circuit 274 is configured to allow different client specific control engines to communicate with the PaaS computing server 220 via a common programming language. As described further herein, the PaaS computing server 220 may further include a fault detection circuit 276 configured to isolate the location of a fault within the data communications center to one or a number of zones. In some examples, the PaaS computing server 220 may perform a particular analytical evaluation of data stored in the service provider database 210 in order to isolate the location of the fault to a particular zone.

Figure 3:
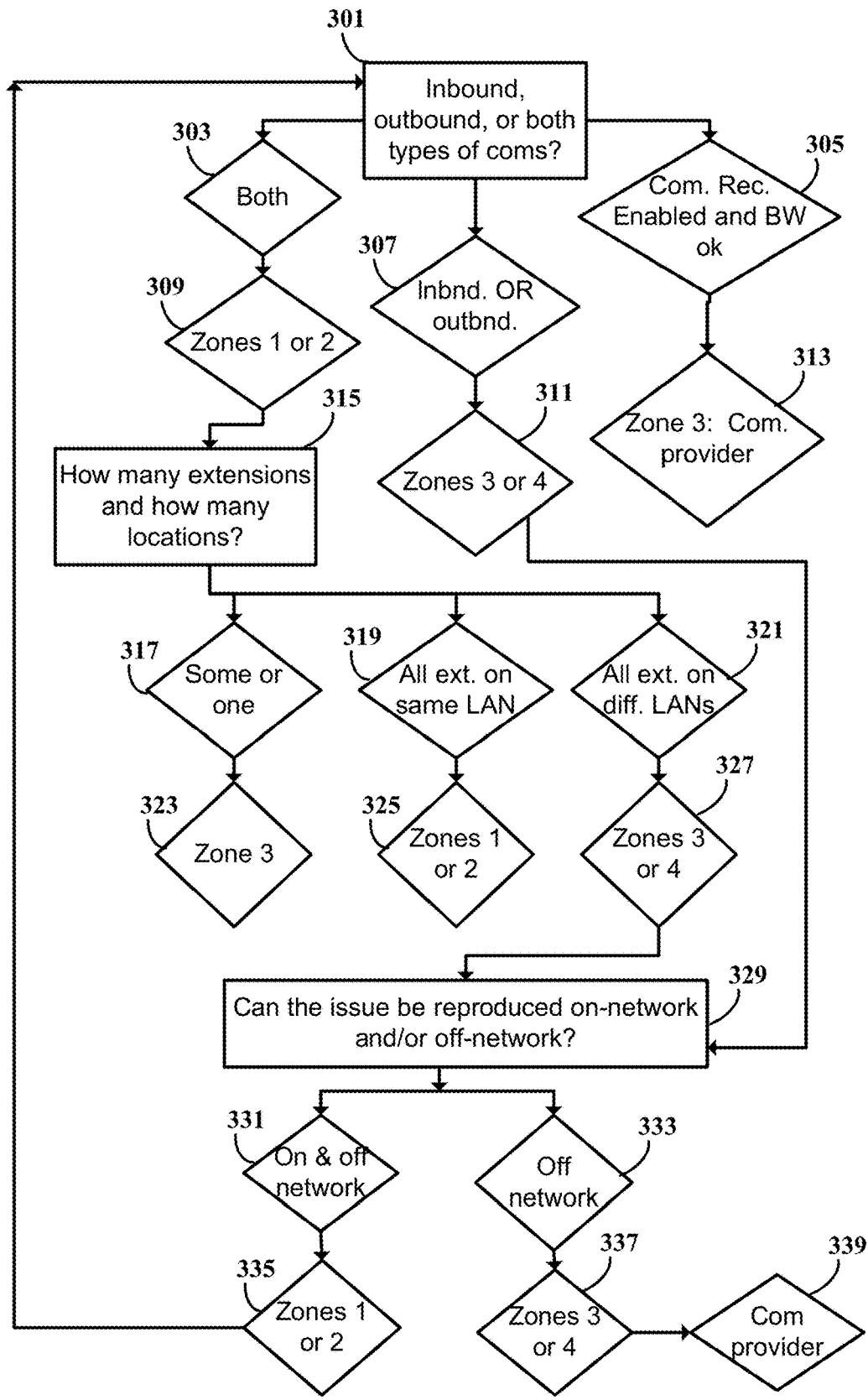
FIG. 3 shows a flow diagram of an example method for fault isolation in a data communications center.

FIG. 3 illustrates a process for fault isolation, consistent with the present disclosure. Particularly, FIG. 3 illustrates processes executed by and/or on behalf of a data communications server (such as by a fault isolation server) to analyze the root cause of data communications quality issues. Initially, the method may include the fault isolation server identifying if the issue being reported is related to data communications quality or data communications termination. Data communications quality refers to or includes data communications that are completed between two parties but experience adverse issues with the timing or quality of data transmission. These include dropped data communications, static, and garbled, choppy or one-way audio. Data communications termination issues refer to or include data communications that are not completed on either one leg of the data communications or both. This includes the inability to receive inbound data communications, the inability to dial outbound entirely, and the inability to dial a specific area code or region. FIG. 3 illustrates the processes performed by the fault isolation server to isolate the root cause of data communications quality issues.

As illustrated at 301, the fault isolation server may determine if all data communications are experiencing data communications quality issues, or if only inbound or outbound data communications are affected. At 303, if both inbound and outbound data communications are experiencing issues, then the fault isolation server is configured and arranged to isolate the fault to zones 1 or 2 (at block 309) and the process may continue to 315. At 305, if the fault isolation server identifies that data communications quality issues only occur when communication recording (e.g., call recording) is enabled and client bandwidth is acceptable, then the fault isolation server is configured and arranged to isolate the fault to zone 3 (at block 313) and the fault isolation server prompts the end user to contact the provider of the data communications service. At 307, if the fault isolation server identifies that only inbound or outbound data communications are experiencing data communications quality issues, the fault isolation server may further isolate the fault to either zone 3 or zone 4 (at block 311) and proceed to box 329.

At 315, the fault isolation server may identify how many extensions are experiencing data communications quality issues, and how many locations are experiencing data communications quality issues. At 317, the fault isolation server may identify that one or some extensions are experiencing issues, and at 323 isolate the fault to zone 1 (e.g., the LAN). In such an example, the fault isolation server may proceed with troubleshooting, starting from various endpoint(s) and then moving upstream. At 319, if the fault isolation server identifies that all extensions are experiencing issues within the same LAN, then the fault isolation server may isolate the fault to zones 1 or 2 at 325. The data communications server may then proceed with troubleshooting starting from the network switch and then moving upstream.

At 321, the fault isolation server may identify that all extensions are experiencing issues but are on different LANs. In such examples, the fault isolation server may identify at 327 that the issue is most likely isolated to Zones 3 or 4, and proceed to 329 to further isolate the fault.

At 329, the fault isolation server may identify whether the issue can be reproduced on-network and/or off-network. At 331, if the fault isolation server determines that both on and off network data communications are experiencing issues, then the issue is isolated down to zones 1 or 2 (at block 335) and the fault isolation server returns to box 301 for further isolation. At 333, if the fault isolation server determines that only off network data communications are experiencing issues, then the issue is isolated to zones 3 or 4 (at block 337) and at 339 the fault isolation server notifies the end user to contact the data communications provider for assistance.

Figure 4:
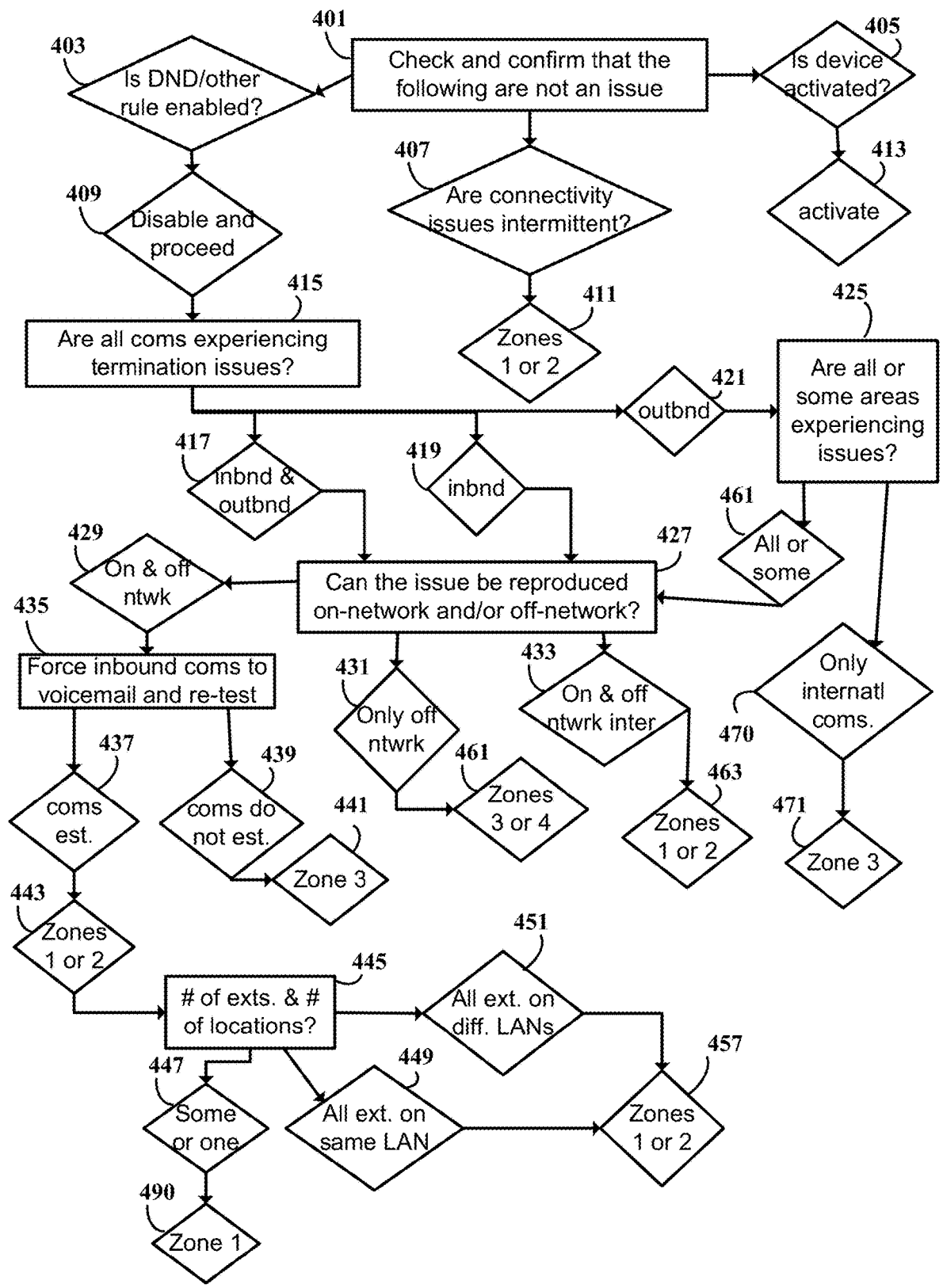
FIG. 4 shows a flow diagram of an example method for fault isolation in a data communications center.

FIG. 4 illustrates a process for fault isolation, consistent with the present disclosure. Particularly, FIG. 4 illustrates processes executed by and/or on behalf of a fault isolation server to analyze root cause(s) of data communications termination issues. Initially, at 401, the fault isolation server may check and confirm various high-level issues. For instance, at 405 the fault isolation server may identify if the device is activated. If it is not, at 413 the fault isolation server may prompt for activation of the device. Similarly, at 403, the fault isolation server may identify if Do Not Disturb (DND) or other forwarding rules are enabled on the endpoint device. If yes, at 409 the fault isolation server may prompt an end-user to disable them and then proceed.

Next, at 407, the fault isolation server may identify if the termination issues are intermittent. If yes, then at 411 the fault isolation server may identify that the issue is isolated to zones 1 or 2 and prompt the end user to proceed with troubleshooting. At 415, the fault isolation server may identify if all data communications are experiencing termination issues. At 417, if both inbound and outbound data communications are not establishing a connection, then the fault isolation server may continue to 427 for further probing. At 419, if it is determined that only inbound data communications are not establishing a connection, then the fault isolation server may continue to 427 to further isolate the issue. However, at 421, if it is determined that only outbound data communications are not establishing a connection, then the fault isolation server may continue to 425 to further isolate the issue. At 425, the fault isolation server may also check that appropriate outbound data communications options are selected in the data communications provider's account manager and that the end-user is entering contact information (e.g., dialing numbers) correctly.

At 427, the fault isolation server may determine if the issue can be reproduced on-network and/or off-network. At 429, if both on and off network data communications are experiencing issues, then the fault isolation server may force inbound data communications to voicemail in the account manager and re-test at 435. At 439, if data communications do not establish, the issue is isolated to zone 3 at block 441 and the fault isolation server instructs the end-user to contact the data communications provider for support. At 437, if data communications establish, then the issue is isolated to zones 1 or 2 at block 443, which requires further probing. In such examples, the fault isolation server proceeds to 445 for isolation. If testing outbound data communications only, forcing the data communications to voicemail is not applicable, and the data communications provider should be contacted. If, at block 431 only off-network data communications are experiencing issues, then the fault isolation server isolates the issue to zones 3 or 4 at block 461, and the end-user is prompted to contact the data communications provider for support. If, at block 433, both on and off network data communications experience intermittent issues, then the fault isolation server isolates the issue to zones 1 or 2 at block 463. In such examples, the fault isolation server prompts the user to proceed with troubleshooting and to double-check the firewall.

As discussed previously, if forcing inbound data communications to voicemail and retesting at block 435 results in data communications being established, then at block 445 the fault isolation server may determine the extensions and locations affected by the issue. If, at block 449, all extensions are experiencing issues within the same LAN, then the fault isolation server isolates the issue to zones 1 or 2 and the end-user is instructed to proceed with troubleshooting starting from the network switch, then move upstream. If, at block 451, the fault isolation server determines that all extensions are experiencing issues but are on different LANs, then the issue is isolated to zones 1 or 2 at block 457 and the end-user is instructed to proceed with troubleshooting starting from the router and moving upstream. If, at block 447, the fault isolation server determines that some or one extension is experiencing issues, then the issue is isolated to zone 1 at block 490 and the end-user is instructed to proceed with troubleshooting starting from the endpoint then moving upstream.

If the fault isolation server determines at block 421 that only outbound data communications are experiencing termination issues, at block 425 the fault isolation server may determine if all or some areas are experiencing issues. At block 461, if all areas are experiencing issues, then the issue is isolated to zones 1, 2, or 3 and the analysis returns to block 427 for further isolation. At block 461, if only some or specific contacts or phone number areas (e.g., area codes) are experiencing issues, then the issue is isolated to zones 3 or 4 and again, the analysis returns to block 427 for further isolation. If, however, at block 470, only international data communications are experiencing issues, then the issue is isolated to zone 3 (at block 471) and the fault isolation server prompts the end-user to check if international data communications is enabled via outbound data communications options, and that the end-user is entering the international contact information (e.g., phone number) correctly. If the issue still remains, then the end-user is prompted to contact the data communications provider for support.

Additional probing questions may be assessed by the fault isolation server. For instance, questions pertaining to the LAN may include assessing when the issues started happening. If there were no issues previously, understanding the timing when symptoms began occurring may help isolate the issue. Additional analyses pertaining to the LAN may include assessing if anything recently changed on the network, such as firmware updates, new network devices, operating system (OS), internet service provider (ISP), etc. If symptoms began occurring after recent changes, that could be the root cause of the data communications quality or termination issue. Similarly, assessments pertaining to the phone service may include assessing if the virtual office desktop is used to make or receive data communications. If so, the fault isolation server may analyze if the same issues exist on the desk phone.

As described herein, various actions may be taken based on the determined source or sources of a data communications quality or termination issue. For instance, in response to a determination that a data communications quality or termination issue likely originates from zones 3 and/or 4, instructions may be provided (such as via a graphical user interface or other interactive means) for an end-user to contact a support number for additional fault isolation and/or identification. In certain embodiments, the server executing the fault isolation process (such as a dedicated data communications server) may generate a report for the particular quality and/or termination issue, including information and/or data obtained during the fault isolation process. In additional embodiments, the fault isolation server may schedule service to repair a particular component of the data communications center.

In another example embodiment, the fault isolation server may instruct an end-user (via a graphical user interface, voice message, text message, SMS message, or other interactive interface) to take particular action in response to isolation of the data communications quality issue and/or data communications termination issue. For instance, in response to isolating a quality and/or termination issue to zones 1 or 2, the fault isolation server may prompt the end-user to check that firewall settings are not preventing origination of data communications, or prompt the end-user to verify that numbers are entered correctly (e.g., including area code, country code, and phone number, etc.).

In various embodiments, the data communications provider may implement a number of processes dependent upon the isolation of the quality and/or termination issue. For instance, in response to a determination that the quality and/or termination issue(s) may include a particular data communications server, the data communications provider may direct that data communications should be re-routed to a different data communications server until the issue is resolved. Additionally and/or alternatively, the data communications provider may notify end-users that quality and/or termination issues may be experienced if data communications are not re-routed, the end-user being provided with an option to re-route data communications to a different data communications server until the issue is resolved or to withstand the potential quality and/or termination issues. The data communications provider may generate reports detailing such issues and/or for communication with the PSTN to troubleshoot identified issues, and in some instances, configure the data communications center to prevent similar quality or termination issues.

More Detailed and/or Experimental Embodiments

More detailed and/or experimental embodiments of the present disclosure are provided. In such examples, there are four zones that define where an issue with endpoints can lie, explained in further detail below. Fault isolation is the method of eliminating these zones until a single zone remains. To eliminate these zones, we ask a series of probing questions that are designed to efficiently and accurately determine probable root cause, then ask follow up questions to outline what actions need to be taken to resolve the issue.

Not all issues can be fixed by an end-user, however. In the event that an issue is isolated to zones 3 or 4, users will have to contact a support agent for assistance. However, through the analysis provided, users will have ample information available so that trouble shooting with a support agent may be expedited.

As illustrated in FIG. 1, four zones were identified for isolation of the root cause of data communications quality/termination issues. Zone 1 covers the connection from the endpoint to the user's router, modem or gateway. This area includes the entirety of the user's Local Area Network or LAN. Zone 2 covers the connection between the user's LAN and the communication service provider's servers. Although this zone begins with the user's LAN, LAN related issues would not be considered as being in this zone. Zone 2 includes the physical connection and signaling that passes through the user's Internet Service Provider or ISP. Zone 3 covers the connection between the communication service provider's servers and the communication service provider's carriers. Zone 4 encompasses the connection between the communication service provider's carriers and the Public Switched Telephone Network (PSTN). This area includes the receiving party's local telephone service provider.

The first step in the analysis is to try and determine whether the issue being reported is related to data communications quality or if it is dealing with data communications termination. Data communications quality refers to or includes data communications that are completed between two parties, but experience issues with the quality or timeliness of transmission. These include dropped data communications, static, and garbled, choppy or one-way audio. Data communications termination refers to or includes data communications that are not completed on either one leg of the data communications or both. This includes the inability to receive inbound data communications, the inability to dial outbound entirely, and the inability to dial a specific area code or region.

A series of data communications quality probing questions may be asked. Are all data communications experiencing communications quality issues? Or just inbound data communications or outbound data communications? If both inbound and outbound data communications are experiencing issues, then it is most likely isolated to zones 1 or 2. Further probing is required to better isolate the issue so proceed to the next question. If issues only occur when data communications recording is enabled and the user's bandwidth looks good, then the communications quality issue is most likely an issue in zone 3 and the next step is to contact the support center of the data communications provider. If only inbound or only outbound data communications are experiencing issues, zones 1 and 2 can be eliminated. The issue is likely not an issue on the service provider's endpoint or the user's LAN. The process can proceed to isolate down to either zone 3 or zone 4.

At the second and third steps of the quality probing questions, it is determined if all extensions affected, namely if one, some, or all locations/LANs are affected. If one or some extensions are experiencing issues, then it is most likely isolated to zone 1. Proceed with troubleshooting, starting from the endpoint(s) and then moving upstream. If all extensions are experiencing issues within the same Local Area Network, then it is most likely isolated to zones 1 or 2. Proceed with troubleshooting starting from the network switch and then moving upstream. If all extensions are experiencing issues but are on different LANs, it is most likely isolated to zones 3 or 4, and the process proceeds to further isolate the issue.

At the fourth step of the quality probing questions, it is determined if the issue can be reproduced on-network and/or off-network. On-Network refers to data communications between endpoints of the communications service provider. Off-network refers to data communications between the communications service provider and PSTN or endpoints other than endpoints of the communications service provider, such as cell phones. If both on and off network data communications are experiencing issues, then the issue is isolated down to zones 1 or 2. The quality probing questions then proceed back to the first step to further isolate the issue. If only off network data communications are experiencing issues, then it is most likely isolated to zones 3 or 4, and the user. At this point, the user is prompted to contact the communications service provider for assistance.

A series of data communications termination probing questions may be asked. First, the user may be prompted to check and confirm that the following are not an issue: Is the device activated? If not, then proceed with activation. Are the CT issues that the user is experiencing intermittent? If yes, the issue is most likely isolated to zones 1 or 2. Proceed with troubleshooting. Is Do Not Disturb (DND) or other forwarding rules on the endpoint enabled? If yes, disable them and then proceed to the second step.

At the second step, it is determined if all data communications are experiencing termination issues. Namely, it is determined if inbound data communications, outbound data communications, or both inbound and outbound data communications are experiencing termination issues. If both inbound and outbound data communications are not establishing a connection, then the analysis proceeds to the fourth step for further probing. If only inbound data communications are not establishing a connection, then the analysis proceeds to the fourth step to further isolate the issue. If only outbound data communications are not establishing a connection, then the analysis proceeds to the fifth step to further isolate the issue. The user is also prompted to check that appropriate outbound data options are selected and that the user is dialing the numbers correctly.

At the third step of the termination analysis, it is determined if all extensions are affected. In particular, it is determined if one or some of the extensions are affected. If all extensions are experiencing issues within the same Local Area Network (LAN), then the issue is most likely isolated to zones 1 or 2. The termination analysis proceeds with troubleshooting starting from the network switch, then moves upstream. If all extensions are experiencing issues but are on different LANs, then the issue is most likely isolated to zone 1 or zone 2. Troubleshoot starting from the router and moving upstream. If some or one extension is experiencing issues, then the issue is most likely isolated to zone 1. The termination analysis proceeds with troubleshooting starting from the endpoint then moving upstream.

At the fourth step of the termination analysis, it is determined if the termination issue can be reproduced issue on-network and/or off-network. On-network refers to data communications between endpoints of the data communications service provider. Off-network refers to data communications between the data communications service provider and PSTN or between endpoints other than the data communications service provider, such as cell phones. If both on and off network data communications are experiencing issues, then the termination analysis forces inbound data communications to voicemail and the network communications are re-tested. If data communications do not establish, the issue has been isolated to zone 3 and the user is prompted to contact the data communications service provider. If data communications establish, then the termination issue can be an issue in zones 1 or 2 which prompts further probing. The user is prompted to go back to the third step of the termination analysis to further isolate the issue. If testing outbound data communications only, forcing the data communications to voicemail is not applicable, and the user is prompted to contact the data communications service provider for support. If only off-network data communications are experiencing issues, then it is most likely isolated to zones 3 or 4, and the user is prompted to contact the data communications service provider for support. If both on and off network data communications experience intermittent issues, then the issue can be isolated to zones 1 or 2.

At the fifth step of the termination analysis, it is determined if all or some areas are experiencing issues. If all areas are experiencing issues, then it can be an issue in zones 1, 2, or 3. The user is prompted to go back to the fourth step of the termination analysis to further isolate the issue. If only some or specific area codes are experiencing issues, then the issue is most likely isolated to zones 3 or 4. The user is prompted to go back to the fourth step of the termination analysis to further isolate the issue. If only international data communications are experiencing issues, then the issue is most likely an issue in zone 3. The user is prompted to check if international data communications is enabled via outbound data communications options, and to ensure that they are dialing the international number correctly. If the issue remains, then the user is prompted to contact the data communications service provider.

Additional probing questions may be asked. Questions pertaining to the user's LAN may be asked, such as when did this start happening? If there were no issues previously, understanding the timing when symptoms began occurring will help isolate the issue. Has anything recently changed on the user's network? (e.g., Firmware Updates, New Network Devices, OS, ISP, etc.) If symptoms began occurring after recent changes, that could be the root cause of the quality or termination issue. Specific probing questions pertaining to the user's voice phone service may be asked, such as are you using a virtual office desktop to make/receive data communications? If so, do you experience the same issues on the desk phone? Data communications initiated or received through virtual office desktops may be handled differently than data communications through a desk phone. Did you check communications options? (e.g., enable international data communications, disable outbound data communications, preferred CODEC, etc.). The user may be prompted to toggle these settings to further isolate the root issue. If the user experiences constant data communications quality problems and have isolated the issue to zone 1, then the user is prompted to analyze network integrity, run speed tests to check for packet loss, jitter, or bandwidth problems www.speedtest.net (run multiple times for consistent data), run a network utility application, run PingPlotter/WinMTR to the regional data center. The user may also be prompted to verify router settings (SIP ALG, Firewall, etc.), and to ensure that SIP ALG is disabled. The user may also be prompted to verify that endpoints are using the correct VLAN if applicable.

If data communications quality problems are intermittent, then the user is prompted to follow the above steps as normal, and also to double check that the Quality of Service (QoS) profiles are correctly configured and enabled, and to note the time of day of the intermittent quality problems.

Various blocks, modules or other circuits may be implemented to carry out one or more of the operations and activities described herein and/or shown in the figures. As examples, the Specification describes and/or illustrates aspects useful for implementing the claimed disclosure by way of various circuits or circuitry using terms such as blocks, modules, device, system, unit, controller, and the like. In these contexts, a "block" (also sometimes "logic circuitry," or "module") is or includes a circuit that carries out one or more of these or related operations/activities (e.g., a data communications control circuit). For example, in certain ones of the above-discussed embodiments, one or more blocks are discrete logic circuits, computer processing circuits, or programmable logic circuits configured and arranged for implementing these operations/activities, as in the blocks shown in the figures. Also, in certain ones of the above-discussed embodiments, an "endpoint device" refers to or includes data communications circuitry configured and arranged for implementing the transmission and/or receipt of data communications. Examples of endpoint devices may include for example, IP phones, smart phones, tablets, desktop computers, plain old telephone service (POTS) telephones, and cellular-capable devices among other example devices. It will also be appreciated that such fault detection analysis processing can be carried out by one or more data communications servers configured with software programming to carry out the processes exemplified in the present disclosure.

Similarly, it will be apparent that a server (e.g., providing a corresponding software platform) includes a computer processing circuit that is configured to provide services to other circuit-based devices. Moreover, an endpoint device (or endpoint) includes a communication circuit such as a radio frequency RF) receiver/transmitter and user-interface, and (computer) processing circuits which are configured to establish data communication sessions with other endpoint devices (e.g., personal computers, IP-enabled mobile phones, and tablet computers). In certain embodiments, such a processing circuit is one or more computer processing circuits programmed to execute a set (or sets) of instructions (and/or configuration data). The instructions (and/or configuration data) can be in the form of software stored in and accessible from a memory circuit, and where such circuits are directly associated with one or more algorithms (or processes), the activities pertaining to such algorithms are not necessarily limited to the specific flows such as shown in the flow charts illustrated in the figures (e.g., where a circuit is programmed to perform the related steps, functions, operations, activities, etc., the flow charts are merely specific detailed examples). The skilled artisan would also appreciate that different (e.g., first and second) modules can include a combination of a central processing unit (CPU) hardware-based circuitry and a set of computer-executable instructions, in which the first module includes a first CPU hardware circuit with one set of instructions and the second module includes a second CPU hardware circuit with another set of instructions.

Certain embodiments are directed to a computer program product (e.g., nonvolatile memory device), which includes a machine or computer-readable medium having stored thereon, instructions which may be executed by a computer (or other electronic device) that includes a computer processor circuit to perform these operations/activities. For example, these instructions reflect activities or data flows as may be exemplified in figures, flow charts, and the detailed description.

Based upon the above discussion and illustrations, those skilled in the art will readily recognize that various modifications and changes may be made to the various embodiments without strictly following the exemplary embodiments and applications illustrated and described herein. For example, although aspects and features may in some cases be described in individual figures, it will be appreciated that features from one figure can be combined with features of another figure even though the combination is not explicitly shown or explicitly described as a combination. Such modifications do not depart from the true spirit and scope of various aspects of the disclosure, including aspects set forth in the claims.

What is claimed is:

1. A data communications server including circuitry configured and arranged to isolate quality or termination issues in a data communications center, the data communications center including a plurality of communication devices, each of which includes circuitry for communicating data, by:
   retrieving server data relating to data communications routed by the data communications server;
   receiving from a plurality of endpoint devices of the plurality of communication devices communicatively coupled to the data communications server in the data communications center, endpoint data relating to the routed data communications;
   identifying whether communication issues in the data communications center are data communications quality or data communications termination issues based on the server data and the endpoint data; and
   identifying at least one zone among a plurality of zones of the data communications center associated with the communication issues, which include the data communications quality or data communications termination issues, using a tiered fault isolation process and based on the server data and endpoint data, by analyzing the communications issues at different tiered levels of common failure aspects, wherein the plurality of zones are associated with a network-based relationship of the communication devices and connections therebetween, and the tiered fault isolation process includes an iterative analysis involving the network-based relationship and the different tiered levels of common failures aspects to isolate the communication issues to the identified at least one zone, the network-based relationship being a function of whether the communication devices are on-network when the communication issues occur, wherein the data communications server is configured and arranged to isolate quality and termination issues in a data communications center, by:
   initiating the tiered fault isolation process in response to analyzing the server data and the endpoint data for identification of a dropped data communication, poor audio performance, and one-way audio, and
   wherein the data communications quality issues are associated with timing and quality of data transmission of data communications completed between at least two parties, and the data communications termination issues are associated with data communications which are uncompleted on at least one leg of the data communications.

2. The data communications server of claim 1, wherein the data communications server is configured and arranged to, in response to identifying the zone associated with the data communications quality or data communications termination issues, perform one or more of the following:
   scheduling service for the identified zone;
   re-routing data communications in the data communications center until the data communication quality or data communication termination issue is resolved; and
   providing an end-user of the data communications center an option to re-route data communications until the data communications quality or data communications termination issue is resolved.

3. A data communications server including circuitry configured and arranged to isolate quality or termination issues in a data communications center, the data communications center including a plurality of communication devices, each of which includes circuitry for communicating data, by:
retrieving server data relating to data communications routed by the data communications server;
receiving from a plurality of endpoint devices of the plurality of communication devices communicatively coupled to the data communications server in the data communications center, endpoint data relating to the routed data communications;
identifying whether communication issues in the data communications center are data communications quality or data communications termination issues based on the server data and the endpoint data; and
identifying at least one zone among a plurality of zones of the data communications center associated with the communication issues, which include the data communications quality or data communications termination issues, using a tiered fault isolation process and based on the server data and endpoint data, by analyzing the communications issues at different tiered levels of common failure aspects, wherein the plurality of zones are associated with a network-based relationship of the communication devices and connections therebetween, and the tiered fault isolation process includes an iterative analysis involving the network-based relationship and the different tiered levels of common failures aspects to isolate the communication issues to the identified at least one zone, the network-based relationship being a function of whether the communication devices are on-network when the communication issues occur, wherein the data communications server is configured and arranged to isolate quality or termination issues in a data communications center, by:
initiating the tiered fault isolation process in response to identification of at least one of an inability to receive inbound Voice over Internet Protocol (VoIP) calls, an inability to dial outbound VoIP calls, and an inability to dial a specific area code or region for VoIP calls, and wherein the tiered fault isolation process including analysis of:
the communication issues being associated with inbound data communications and outbound data communication or one of inbound data communications and outbound data communications,
extensions associated with the communication issues, and
whether the communication issues occur on-network, off-network, or both.

4. The data communications server of claim 3, wherein the data communications server is configured and arranged to isolate quality or termination issues in a data communications center, by:
correlating an incidence of the identified data communications quality or data communications termination issues to a hardware or software change in the data communications center.

5. The data communications server of claim 1, wherein the data communications server is configured and arranged to isolate quality or termination issues in a data communications center, by:
initiating a network integrity analysis in response to a determination that data communications quality issues are present for a threshold period of time and the data communications quality issue is isolated to a zone of the plurality of zones which includes a local area network (LAN).

6. The data communications server of claim 1, wherein the tiered levels include at least two of:
a determination whether the data communications quality issue affects both inbound and outbound data communications;
identification of a number of extensions that are affected by the data communications quality issue; and
identification of a number of endpoint locations or local area networks (LANs) that are affected by the data communications quality issue.

* * * * *